United States Patent [19]

Cavitt et al.

[11] Patent Number: 4,575,543

[45] Date of Patent: Mar. 11, 1986

[54] LOW VISCOSITY EPOXY AND PHENOXY RESINS

[75] Inventors: Michael B. Cavitt; William O. Perry; Robert E. Hefner, Jr., all of Lake Jackson, Tex.

[73] Assignee: The Dow Chemical Company, Midland, Mich.

[21] Appl. No.: 730,008

[22] Filed: May 3, 1985

[51] Int. Cl.$^4$ ............................................. C08G 59/14
[52] U.S. Cl. ................................. 525/510; 525/523; 525/528; 528/45; 528/73; 528/87
[58] Field of Search ............................ 528/87, 45, 73; 525/523, 510, 528

[56] References Cited

U.S. PATENT DOCUMENTS

| | | | |
|---|---|---|---|
| 3,404,126 | 10/1968 | Welch et al. | 528/87 X |
| 3,438,911 | 4/1969 | Dobinson | 260/2 |
| 3,488,321 | 1/1970 | Dobinson et al. | 525/533 X |
| 3,507,819 | 4/1970 | Vegter et al. | 528/87 X |
| 3,530,096 | 9/1970 | Dobinson et al. | 260/47 |
| 3,553,162 | 1/1971 | Smith | 525/523 X |
| 3,804,795 | 4/1974 | Perry et al. | 260/30.4 EP |

*Primary Examiner*—Earl Nielsen
*Attorney, Agent, or Firm*—James G. Carter

[57] ABSTRACT

The viscosity of epoxy resins and phenoxy resins having an average weight average molecular weight of from about 1,700 to about 100,000 and containing an average of at least about 4.5 aliphatic hydroxyl groups per molecule is reduced by reacting said epoxy or phenoxy resin with a trihalomethyl acyl aromatic compound such as trichloroacetophenone in the presence of a tertiary amine such as triethylamine. These modified resins have particular utility in the preparation of coatings, adhesives, laminates, flooring and the like.

20 Claims, No Drawings

LOW VISCOSITY EPOXY AND PHENOXY RESINS

BACKGROUND OF THE INVENTION

The present invention pertains to the reduction of the viscosity of epoxy resins and phenoxy resins by reaction with a trichloroacetophenone.

Perry, et al in U.S. Pat. No. 3,804,795 disclosed a method for reducing the viscosity of epoxy resins by reacting them with an ethylenically unsaturated ether such as methyl isopropenyl ether.

The present invention provides a novel method for reducing the viscosity of epoxy and phenoxy resins by reacting the epoxy or phenoxy resin with a trihalomethyl acyl aromatic compound.

SUMMARY OF THE INVENTION

One aspect of the present invention pertains to a process for reducing the viscosity of epoxy or phenoxy resins which comprises reacting (A) at least one epoxy or phenoxy resin having an average weight average molecular weight of from about 1,700 to about 100,000 and containing an average of at least about 4.5 hydroxyl groups per molecule; with (B) at least one trihalomethyl acyl aromatic compound; in the presence of (C) a catalytic amount of at least one tertiary amine; wherein components (A) and (B) are present in an amount of from about 0.1 to about 0.9 moles of component (B) per mole of hydroxyl groups contained in component (A).

Another aspect of the present invention pertains to the product produced by the aforementioned process.

Still another aspect of the present invention pertains to an adhesive, coating or laminate composition containing the product produced by the aforementioned process.

DETAILED DESCRIPTION OF THE INVENTION

Suitable epoxy or phenoxy resins which can be modified by the present invention include those relatively high molecular weight epoxy resins or phenoxy resins prepared by reacting a glycidyl ether of an aliphatic or aromatic compound having an average of more than one epoxide group per molecule with an aromatic hydroxyl-containing compound having an average of more than one aromatic hydroxyl group per molecule, wherein the resultant product has an average weight average molecular weight of from about 1,700 to about 100,000 and an average of at least about 4.5 hydroxyl groups per molecule. These hydroxyl groups in the case of the advanced epoxy resins are pendant aliphatic hydroxyl groups resulting from ring opening reaction of the epoxy group with the aromatic hydroxyl group. The hydroxyl groups in the case of the phenoxy resins are either the terminal aromatic hydroxyl groups or the hydroxyl groups resulting from reaction of the epoxy group with the aromatic hydroxyl group or a combination of such hydroxyl groups.

Suitable glycidyl ethers of aliphatic hydroxyl-containing compounds which can be employed to prepare the epoxy or phenoxy resins by reaction with an aromatic hydroxyl-containing compound which is modified by the process of the present invention include, for example, glycidyl ethers of ethylene glycol, propylene glycol, dipropylene glycol, tripropylene glycol, 1,4-butanediol, 1,6-hexanediol, polyoxyethylene glycols, polyoxypropylene glycols, polyoxybutylene glycols, polyoxyalkylene glycols prepared from a mixture or alternate addition of any two or more of ethylene oxide, propylene oxide, butylene oxide or styrene oxide, glycerine, 1,2,3-trihydroxybutane, 1,2,4-trihydroxybutane, trimethylolpropane, hydrogenated bisphenols, cyclohexane dimethanol, mixtures thereof and the like.

Suitable glycidyl ethers of aromatic hydroxyl-containing compounds which can be employed to prepare the epoxy or phenoxy resins by reaction with a polyhydroxy aromatic compound which is modified by the process of the present invention include, for example, those represented by the following formulas

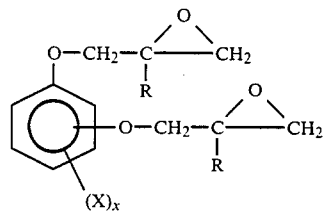

FORMULA I

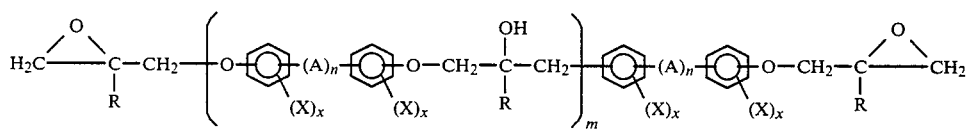

FORMULA II wherein A is a divalent hydrocarbyl group having from 1 to about 10 carbon atoms, —O—, —S—, —S—S—,

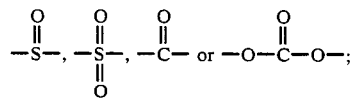

each X is independently hydrogen, a monovalent hydrocarbyl or hydrocarbyloxy group having from 1 to about 10 carbon atoms, or a halogen, preferably chlorine or bromine; each n independently has a value of zero or 1; m has a value from zero to less than 4.5; and x has a value of from zero to about 4.

Suitable aromatic hydroxyl containing compounds which can be employed to prepare the epoxy or phenoxy resins which are modified by the process of the present invention include, for example, those represented by the following formulas

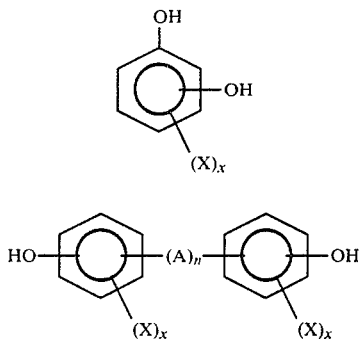

FORMULA III

FORMULA IV wherein A, X, n and x are as defined above.

Particularly suitable aromatic hydroxyl-containing compounds include, for example, resorcinol, catechol, hydroquinone, phloroglucinol, bisphenol A, 2,2′,6,6′-tetramethyl bisphenol A, 2,2′-dimethoxy bisphenol A, tetrabromobisphenol A, mixtures thereof and the like.

The most preferred epoxy resins or phenoxy resins which can be modified by the process of the present invention include, for example, those represented by the following formula V wherein A, X, n and x are as defined in Formula II; each A′ is independently hydrogen or a hydrocarbyl or hydrocarbyloxy group having from 1 to about 10 carbon atoms; m has an average value of from about 4.5 to about 351 and each y independently has a value of zero or 1.

example, trichloroacetophenone, trichloromethyl acyl toluene, trichloromethyl acyl methoxy benzene, trichloromethyl acyl naphthalene, mixtures thereof and the like.

Particularly suitable tertiary amine catalysts which can be employed to catalyze the reaction between the epoxy or phenoxy resin and the trichloromethyl acyl aromatic compound include, for example, N-methylmorpholine, triethylamine, tributylamine, benzyldimethylamine, tris(dimethylaminomethyl)phenol, 2-methylimidazole, mixtures thereof and the like.

The catalyst can be employed in any quantity which will catalyze the reaction. Suitably from about 0.01 to about 0.5, preferably from about 0.05 to about 0.16 moles of catalyst per hydroxyl equivalent contained in the epoxy or phenoxy resin is employed. If desired, higher amounts of catalyst can be employed.

The reaction between the epoxy or phenoxy resin and the trihalomethyl acyl aromatic compound is usually conducted at a temperature of from about 25° C. to about 65° C., preferably from about 40° C. to about 60° C.

The reaction can be conducted in the presence of a suitable solvent such as, for example, tetrahydrofuran, dimethyl formamide, dioxane, acetone, methyl ether ketone, diethyl ether, combinations thereof and the like.

Epoxy resins or phenoxy resins of the present invention are useful to make laminates, adhesives, castings, coatings, encapsulations and the like. The laminates are made by curing the polymer modified epoxy resin to

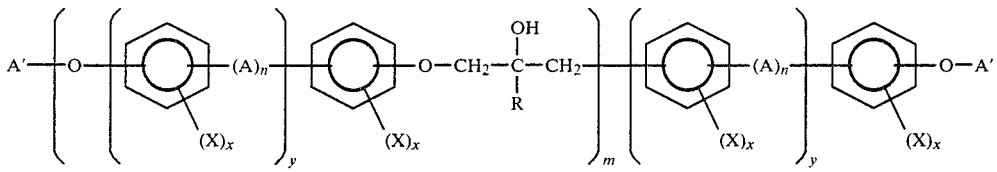

FORMULA V

Suitable trihalomethyl acyl aromatic compounds which can be employed herein include, for example, those represented by the following formulas VI and VII

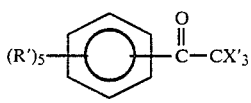

FORMULA VI

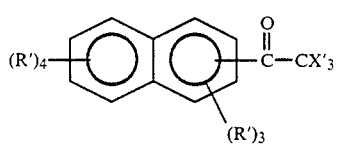

FORMULA VII wherein each X′ is a halogen, preferably chlorine, each R′ is independently hydrogen or a hydrocarbyl or hydrocarbyloxy group having from 1 to about 6 carbon atoms.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Particularly suitable trihalomethyl acyl aromatic compounds which can be employed herein include, for which a suitable fibrous reinforcement such as carbon fibers, glass fibers, aramid fibers or inorganic fibers has been added. The fibers may be in the form of mats, strands, sheets, filaments, yarns, chopped strands, ribbons, and the like. The epoxy resins or phenoxy resins can be rolled, sprayed or impregnated into the fibrous reinforcement.

Epoxy resins or phenoxy resins of the present invention may be compounded with solvents, pigments, fire suppressants, low profile additives, flow control additives, fillers or other resinous products.

Epoxy resins or phenoxy resins of the present invention may be cured as described in *Handbook of Epoxy Resins* by Lee and Neville, McGraw-Hill, 1967 which is incorporated herein by reference. Suitable curing agents include, for example, amines, amides, melamine-formaldehydes, urea-formaldehydes, polyisocyanates, blocked polyisocyanates.

The following examples are illustrative of the invention, but are not to be construed as to limiting the scope thereof in any manner.

The viscosity for solid samples was determined by using an ICI cone and plate viscometer. Viscosity for resins in solution was determined by the Gardner-Holt method.

The following components were employed in the examples.

Catalyst A was a 70 weight percent solution of ethyltriphenylphosphonium acetate acetic acid complex in methanol.

Epoxy Resin A was a diglycidyl ether of bisphenol A having an average epoxide equivalent weight (EEW) of about 185.7.

Epoxy Resin B was a diglycidyl ether of bisphenol A having an average EEW of about 1830 and a viscosity at 175° C. of >10,000 cp (>10 Pa·s) and at 200° C. of 8,100 cp (8.1 Pa·s).

Epoxy Resin C was a phenoxy resin based on bisphenol A and the diglycidyl ether of bisphenol A having an average molecular weight of 25,000 and dissolved in methyl ethyl ketone at 40% nonvolatiles.

COMPARATIVE EXPERIMENT A

A reaction vessel equipped with a stirrer, heating mantle, nitrogen purge and temperature control was charged with 111.4 g (0.599 epoxy equivalent) of Epoxy Resin A and 48.6 g (0.426 equivalent) of bisphenol A then heated to 90° C. at which time 0.14 g (0.0002 mole) of Catalyst A was added. The temperature was increased to 150° C. and then the reaction mass exothermed to 178° C. The temperature was increased to 200° C. in 0.58 hour (2088 s) and maintained at 200° C. for 0.42 hour (1512 s). The viscosity at 150° C. was >10,000 cp (>10 Pa·s) at 175° C. was 3550 cp (3.55 Pa·s) and at 200° C. was 1200 cp (1.2 Pa·s).

EXAMPLE 1

A reaction vessel equipped with a stirrer, condenser, heating mantle and temperature control was charged with 30 g (0.029 epoxy equivalent) of the advanced epoxy resin of Comparative Experiment A, 200 g (2.78 moles) of tetrahydrofuran, 17 g (0.076 mole) of trichloroacetophenone and then heated to 61° C. at which time 0.45 g (0.0044 mole) of triethylamine was added. The temperature was maintained between 61°-62° C. for 5.52 hour (19,872 s) then the volatiles were removed by vacuum stripping at 67° C. The viscosity at 150° C. was 7,200 cp (7.2 Pa·s), at 175° C. was 2,100 cp (2.1 Pa·s) and at 200° C. was 750 cp (0.75 Pa·s).

EXAMPLE 2

A reaction vessel equipped with a stirrer, condenser, heating mantle and temperature control was added 60 g (0.033 epoxy equivalent) of Epoxy Resin B, 200 g (2.78 moles) of tetrahydrofuran, 35 g (0.158 mole) of trichloroacetophenone and then heated to 65° C. at which time 1.2 g (0.012 mole) of triethylamine was added. The temperature was maintained at 65° C. for 5 hours (18,000 s). Then the volatiles were removed by vacuum stripping at 65° C. The viscosity at 175° C. was 8,600 cp (8.6 Pa·s) and at 200° C. was 3,300 cp (3.3 Pa·s).

COMPARATIVE EXPERIMENT B

Into a vacuum oven was placed Epoxy Resin C at an oven temperature of 180° C. A vacuum was applied and the sample left in the vacuum oven for 1 hour (3600 s). The sample was removed and cooled to ambient temperature. A solution was made by using 3.77 g of this resin, 11.31 g of propylene glycol monomethyl ether and 4.4 g of methylene chloride (19.4% nonvolatile). The Gardner-Holt viscosity was found to be M-N at 25° C.

EXAMPLE 3

A reaction vessel equipped with a stirrer, condenser, heating mantle and temperature control was added 30 g of Epoxy Resin C, 150 g (2.08 mole) of tetrahydrofuran, 20 g (0.09 mole) of trichloroacetophenone and then heated to 60° C. at which time 1.2 g (0.012 mole) of triethylamine was added. The temperature was maintained between 60°-61° C. for 5 hours (18,000 s) then the volatiles were removed by vacuum stripping at 68° C. The product was then placed into a vacuum oven at a temperature of 180° C. for 1 hour (3600 s). The sample was removed and cooled to ambient temperature (25° C.). A solution was made by using 4 g of product, 12 g of propylene glycol monomethyl ether and 4.7 g of methylene chloride (19.3% nonvolatiles). The Gardner-Holt viscosity was found to be E-K at 25° C.

We claim:

1. A process for reducing the viscosity of epoxy or phenoxy resins which comprises reacting
   (A) at least one epoxy or phenoxy resin having an average weight average molecular weight of from about 1,700 to about 100,000 and containing an average of at least about 4.5 hydroxyl groups per molecule; with
   (B) at least one trihalomethyl acyl aromatic compound; in the presence of
   (C) a catalytic amount of at least one tertiary amine; wherein components (A) and (B) are present in an amount of from about 0.1 to 0.9 moles of component (B) per mole of hydroxyl groups contained in component (A).

2. A process of claim 1 wherein the reaction is conducted at a temperature of from about 25° C. to about 65° C. in the presence of an inert solvent.

3. A process of claim 2 wherein the reaction is conducted at a temperature of from about 40° C. to about 60° C. in the presence of tetrahydrofuran.

4. A process of claim 1 wherein component (A) is represented by formula II in the specification wherein A is a divalent hydrocarbyl group having from 1 to about 4 carbon atoms, each X is independently hydrogen, bromine or a methyl group, m has an average value from about 4.5 to about 351, n has a value of zero or 1 and each x independently has a value of zero to 4; and component (B) is represented by the formula VI in the specification wherein each R' is hydrogen or a hydrocarbyl or hydrocarbyloxy group having from 1 to about 6 carbon atoms and X is chlorine.

5. A process of claim 4 wherein component (A) is a diglycidyl ether of bisphenol A or tetrabromobisphenol A and component (B) is trichloroacetophenone.

6. The product produced by the process of claim 1.

7. The product produced by the process of claim 2.

8. The product produced by the process of claim 3.

9. The product produced by the process of claim 4.

10. The product produced by the process of claim 5.

11. The product resulting from curing a composition comprising (A) a product of claim 6 and (B) a curing quantity of a suitable curing agent therefor.

12. The product resulting from curing a composition comprising (A) a product of claim 7 and (B) a curing quantity of a suitable curing agent therefor.

13. The product resulting from curing a composition comprising (A) a product of claim 8 and (B) a curing quantity of a suitable curing agent therefor.

14. The product resulting from curing a composition comprising (A) a product of claim 9 and (B) a curing quantity of a suitable curing agent therefor.

15. The product resulting from curing a composition comprising (A) a product of claim 10 and (B) a curing quantity of a suitable curing agent therefor.

16. The product of claim 11 which is a coating, adhesive or laminate.

17. The product of claim 12 which is a coating, adhesive or laminate.

18. The product of claim 13 which is a coating, adhesive or laminate.

19. The product of claim 14 which is a coating, adhesive or laminate.

20. The product of claim 15 which is a coating, adhesive or laminate.

* * * * *